United States Patent
Singh et al.

(10) Patent No.: US 10,445,900 B1
(45) Date of Patent: Oct. 15, 2019

(54) VEHICLE VISION SYSTEM WITH CAMERA CALIBRATION

(71) Applicant: MAGNA ELECTRONICS INC., Auburn Hills, MI (US)

(72) Inventors: Jagmal Singh, Aschaffenburg (DE); Sebastian Pliefke, Sailauf (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/536,381

(22) Filed: Aug. 9, 2019

Related U.S. Application Data

(63) Continuation of application No. 15/677,452, filed on Aug. 15, 2017, now Pat. No. 10,380,765.

(60) Provisional application No. 62/375,919, filed on Aug. 17, 2016.

(51) Int. Cl.
*G06T 7/80* (2017.01)
*G06T 7/73* (2017.01)
*B60R 1/00* (2006.01)
*B60R 1/12* (2006.01)

(52) U.S. Cl.
CPC ............... *G06T 7/80* (2017.01); *B60R 1/00* (2013.01); *G06T 7/73* (2017.01); *B60R 1/12* (2013.01); *B60R 2001/1253* (2013.01); *B60R 2300/105* (2013.01); *B60R 2300/303* (2013.01); *B60R 2300/8093* (2013.01); *G06T 2207/30244* (2013.01); *G06T 2207/30252* (2013.01)

(58) Field of Classification Search
CPC ..... B60R 1/00; B60R 1/12; B60R 2001/1253; B60R 2300/105; B60R 2300/303; B60R 2300/8093; G06T 7/80; G06T 7/73; G06T 2207/30244; G06T 2207/30252
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,421,865 | B2 | 4/2013 | Euler et al. |
| 9,150,155 | B2 | 10/2015 | Vico et al. |
| 9,205,776 | B2 | 12/2015 | Turk |
| 9,357,208 | B2 | 5/2016 | Gupta et al. |
| 9,491,450 | B2 | 11/2016 | Kussel |
| 9,491,451 | B2 | 11/2016 | Pliefke |
| 9,563,951 | B2 | 2/2017 | Okouneva |

(Continued)

*Primary Examiner* — Huy T Nguyen
(74) *Attorney, Agent, or Firm* — Honigman LLP

(57) ABSTRACT

A method for calibrating a camera of a vehicular vision system includes capturing a first frame of image data by the camera during a first ignition cycle of the vehicle, and, responsive to ending the first ignition cycle of the vehicle, saving to memory the first frame of captured image data. A second frame of image data is captured by the camera during a second ignition cycle of the vehicle following the first ignition cycle. The first frame of captured image data is compared by an image processor to the second frame of captured image data to determine a change in orientation of the camera. Responsive to determination of the change in orientation of the camera, processing by the image processor of frames of image data captured by the camera during the second ignition cycle is adjusted to accommodate the determined change in orientation of the camera.

22 Claims, 2 Drawing Sheets

(56) References Cited

U.S. PATENT DOCUMENTS

| | | |
|---|---|---|
| 9,688,200 B2 | 6/2017 | Knudsen |
| 9,723,272 B2 | 8/2017 | Lu et al. |
| 9,762,880 B2 | 9/2017 | Pflug |
| 9,834,153 B2 | 12/2017 | Gupta et al. |
| 10,380,765 B2 | 8/2019 | Singh et al. |
| 2011/0216201 A1 | 9/2011 | McAndrew et al. |
| 2014/0169627 A1 | 6/2014 | Gupta |
| 2014/0247352 A1 | 9/2014 | Rathi et al. |
| 2014/0333729 A1 | 11/2014 | Pflug |
| 2014/0350834 A1 | 11/2014 | Turk |
| 2015/0002670 A1 | 1/2015 | Bajpai |
| 2015/0049193 A1 | 2/2015 | Gupta et al. |
| 2015/0175072 A1 | 6/2015 | Sabeti |
| 2015/0178576 A1 | 6/2015 | Gupta |
| 2015/0291215 A1 | 10/2015 | Bajpai et al. |
| 2015/0332446 A1 | 11/2015 | Wang et al. |
| 2016/0180182 A1 | 6/2016 | Gupta et al. |
| 2016/0210750 A1 | 7/2016 | Singh et al. |
| 2016/0335510 A1 | 11/2016 | Gupta et al. |
| 2017/0278270 A1 | 9/2017 | Singh et al. |
| 2018/0174327 A1 | 6/2018 | Singh |
| 2018/0281698 A1 | 10/2018 | Tang et al. |
| 2018/0299533 A1 | 10/2018 | Pliefke et al. |

VEHICLE VISION SYSTEM WITH CAMERA CALIBRATION

CROSS REFERENCE TO RELATED APPLICATIONS

The present application is a continuation of U.S. patent application Ser. No. 15/677,452, filed Aug. 15, 2017, now U.S. Pat. No. 10,380,765, which claims the filing benefits of U.S. provisional application Ser. No. 62/375,919, filed Aug. 17, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a camera calibration system that determines a change in orientation of cameras (such as due to loading or unloading of the vehicle) without requiring movement of the vehicle. The system stores images captured at the end of an ignition cycle of the vehicle (such as when the vehicle is stopped and before the ignition is turned off), and, when the vehicle is again started, the system compares newly captured images with the stored captured images to determine if there has been a change in the camera orientation. If a change is determined (such as due to loading or unloading of the vehicle while the ignition was off), the system calibrates the cameras and/or system accordingly, such that displayed images (such as images derived from image data captured by the vehicle cameras and stitched or merged to provide a surround view display) are aligned and adjusted to accommodate the determined offset.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may display video images, such as a rearview display or a top down or bird's eye or surround view display (SVS) or the like.

Figure 1:
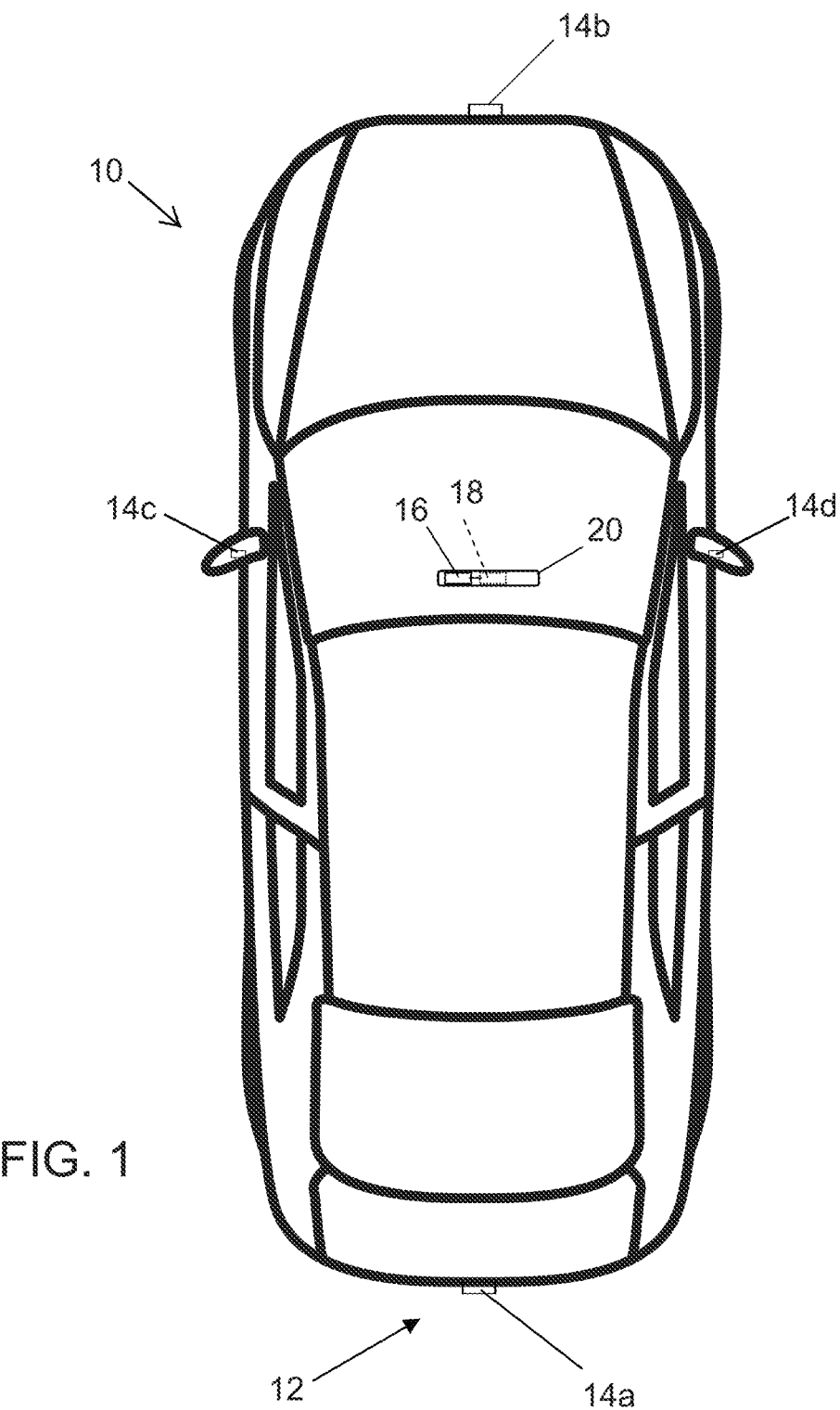
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14*a* (and the system may optionally include multiple exterior facing imaging sensors or cameras, such as a forward facing camera 14*b* at the front (or at the windshield) of the vehicle, and a sideward/rearward facing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Extrinsic camera calibration is necessary for providing a proper SVS top view image stitched out of four cameras. Long term calibration takes care of camera alignment relative to the vehicle. For covering situations where the vehicle pitch, yaw, roll orientation or vehicle height changes, such as due to additional luggage, occupants or load brought into or removed from the vehicle, past the last duty cycle, a specific short term extrinsic calibration should come into use. Another use case is to detect a camera misalignment due to a not fully closed trunk door or lid (such as for a rear camera mounted at the not fully closed door or lid).

The method of the present invention triggers and executes a short term extrinsic calibration to store feature points of a structure from motion (SfM) detection of the last frame of a duty cycle. By comparing these feature points with points detected after waking up the camera system again (such as when the vehicle is again started after it had been shut off) enables the system to detect offsets in the according camera images and to calibrate the system based on these offsets. The calibration may be temporary or short term, in that, when the vehicle is loaded, the system may adapt for the loaded orientation, and then when the vehicle is later unloaded, the system may again adapt the calibration (or return to its initial calibration) for the unloaded orientation. The calibration may adjust the processing of image data captured by the camera(s) to account for the determined change, such that the image data, when stitched with image data captured by the multiple cameras, provides a displayed composite image that is generally or substantially seamless.

In a surround view system, cameras are mounted on front, rear, left and right side of the vehicle, and images from all four (or more) cameras are stitched to generate a top-view/bowl-view/3D view. Extrinsic camera calibration is carried out generally at the vehicle manufacturing plant, or as long term calibration to take care of extrinsic changes due to normal usage, mechanical shocks, thermal changes and/or the like. Even for the calibrated camera (calibrated relative to the vehicle), there is a need for short term calibration, such as, for example, if vehicle loading changes suddenly (resulting in a change in pitch or yaw or roll of the vehicle and its cameras relative to the ground). Such short term calibration can be achieved by a really high performance long term calibration algorithm, which calibrates the camera on a short drive immediately after the vehicle moves after loading changes.

The short term calibration method of the present invention does not require such motion after vehicle loading. The method uses structure from motion (SfM) for short term calibration. When the vehicle is slowing down, a 3D point cloud of the surroundings is generated using SfM in the field of view of all of the vehicle cameras. For feature detection, the system detects counters in the scene for tracking. Once the vehicle stops, the systems captures and stores the last frame of image data, with 3D information of the object in that frame (from 3D point cloud due to previous motion).

When the vehicle is loaded (or unloaded), the orientation (e.g., pitch, yaw, roll) of the camera may change relative to the ground and horizon. For example, due to vehicle loading, camera angles and z-position may change (changes in x and y position will be minimal). After the vehicle is loaded/unloaded, and the system is activated (such as when the vehicle is started again after such loading/unloading), the system captures again the first frame of image data. The features in this first frame on new start or current ignition cycle are matched with the stored last frame from previous ignition cycle. Even if something changes in the scene, such as another vehicle is parked behind the equipped vehicle and in the field of view of the camera, due to the larger field of view of the camera (that encompasses regions beyond where the parked vehicle is located), there will still be several features that can be matched in two frames. Having already the 3D information available for the features, camera calibration can then be performed as a mathematical problem.

One way to verify the correctness is to build a logic, such as, for example, when the front and rear cameras give the same offset, but with different signs, this means that there is a case of vehicle loading (where, for example, the rear of the vehicle may lower to tilt the vehicle so that the rear camera views more downward and the front camera views more upward as compared to the pre-loading views). Another scenario could be that the trunk door was not closed correctly leading to a pitch offset, and this can be detected by short term calibration of all four cameras.

Figure 2:
FIG. 2 is a camera image of a scene captured without loading of the vehicle, showing 3D information of detected points that are known due to previous motion.
Figure 3:
FIG. 3 is a camera image of a scene captured after loading of the vehicle, showing features that are detected and matched with the last frame from previous ignition cycle.

For example, comparing FIG. 2 (unloaded vehicle) with FIG. 3 (loaded vehicle), it is noticeable that the field of view of the rear camera is more downward in FIG. 3 (loaded vehicle) than the field of view of the rear camera in FIG. 2 (unloaded vehicle). The system processes the captured image data frames (where the image of FIG. 2 may have been captured when the vehicle was stopped and at or near the end of a first ignition cycle of the vehicle, and the image of FIG. 3 may have been captured at the start of a second or subsequent ignition cycle) to track the change in position of the various features or points in the image data frames to determine such a shift in the field of view of the camera. This determination is done before any movement of the vehicle at the onset of the second or subsequent or current ignition cycle.

The subsequent or current ignition cycle is the next time the ignition of the vehicle is cycled and may be at any time following the previous ignition cycle. For example, the previous ignition cycle may end when the vehicle is parked (whereby the system captures a frame of image data and stores the frame of image data). Later, such as several seconds later or several days later, when the vehicle ignition is next cycled, the system again captures a frame of image data and compares that captured frame of image data (captured in the current or subsequent ignition cycle) to the frame of image data captured at the end of the previous ignition cycle.

Thus, the present invention provides a short term calibration system that stores images captured at the end of an ignition cycle of the vehicle (such as when the vehicle is stopped and before the ignition is turned off). When the vehicle is again started, the system compares newly captured images with the stored captured images to determine if there has been a change in the camera orientation. If a change is determined (such as due to loading of the vehicle or unloading of the vehicle while the ignition was off), the system determines the offset or misalignment and may calibrate the cameras and/or system accordingly, such that displayed images (derived from image data captured by the vehicle cameras and stitched or merged to provide a surround view display) are aligned and adjusted to accommodate the determined offset.

The system may utilize aspects of the vision systems and calibration systems described in U.S. Pat. Nos. 9,723,272; 9,688,200; 9,563,951; 9,491,451; 9,491,450; 9,357,208; 9,205,776; 9,150,155; 8,421,865; 7,720,580 and/or 7,038,577, and/or U.S. Publication Nos. US-2014-0333729; US-2014-0247352; US-2014-0169627; US-2016-0180182; US-2015-0002670; US-2015-0049193; US-2015-0291215; US-2015-0178576; US-2015-0175072; US-2016-0210750 and/or US-2016-0335510, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a camera of a vehicular vision system, said method comprising:

providing a camera at a vehicle so as to have a field of view exterior of the vehicle;

providing an image processor at the vehicle for processing frames of image data captured by the camera;

capturing a first frame of image data by the camera during a first ignition cycle of the vehicle;

responsive to ending the first ignition cycle of the vehicle, saving to memory the first frame of captured image data;

capturing a second frame of image data by the camera during a second ignition cycle of the vehicle following the first ignition cycle;

comparing, via the image processor, the first frame of captured image data to the second frame of captured image data;

determining, via comparison by the image processor of the first frame of captured image data to the second frame of captured image data, a change in orientation of the camera from a first orientation during the first ignition cycle of the vehicle to a second orientation during the second ignition cycle of the vehicle; and responsive to determination of the change in orientation of the camera, adjusting processing by the image processor of frames of image data captured by the camera during the second ignition cycle to accommodate the determined change in orientation of the camera.

2. The method of claim 1, wherein determining a change in orientation of the camera comprises determining a change in orientation of the camera relative to ground that is indicative of loading or unloading of the vehicle between the first and second ignition cycles.

3. The method of claim 1, wherein capturing the first frame of image data by the camera comprises capturing the first frame of image data by the camera when the vehicle is stationary, and wherein capturing the second frame of image data by the camera comprises capturing the second frame of image data by the camera when the vehicle is stationary.

4. The method of claim 1, wherein capturing the first frame of image data by the camera comprises capturing the first frame of image data by the camera at or near the end of the first ignition cycle of the vehicle, and wherein capturing the second frame of image data by the camera comprises capturing the second frame of image data by the camera at the onset of the second ignition cycle of the vehicle.

5. The method of claim 4, wherein capturing the first frame of image data by the camera comprises capturing the first frame of image data by the camera when the vehicle is stationary at or near the end of the first ignition cycle of the vehicle.

6. The method of claim 4, wherein capturing the second frame of image data by the camera comprises capturing the second frame of image data by the camera when the vehicle is stationary at or near the onset of the second ignition cycle of the vehicle.

7. The method of claim 1, wherein the second ignition cycle is the next ignition cycle of the vehicle following the first ignition cycle.

8. The method of claim 1, wherein comparing the first frame of captured image data to the second frame of captured image data comprises comparing features of the second frame of captured image data to features of the first frame of captured image data to determine the change in orientation of the camera.

9. The method of claim 1, comprising providing a video display in the vehicle that is viewable by a driver of the vehicle, wherein the video display displays video images derived from frames of image data captured by the camera.

10. The method of claim 9, wherein adjusting processing by the image processor of frames of image data captured by the camera during the second ignition cycle comprises adjusting processing by the image processor of frames of image data captured by the camera during the second ignition cycle to adjust display of video images at the video display.

11. The method of claim 1, wherein providing a camera comprises providing a rear camera at a rear portion of the vehicle that has a field of view rearward of the vehicle.

12. The method of claim 1, wherein providing a camera comprises providing a plurality of cameras at the vehicle that have respective fields of view exterior of the vehicle.

13. A method for calibrating a camera of a vehicular vision system, said method comprising:
providing a camera at a vehicle so as to have a field of view exterior of the vehicle;
providing an image processor at the vehicle for processing frames of image data captured by the camera;
capturing a first frame of image data by the camera when the vehicle is stationary during a first ignition cycle of the vehicle;
responsive to ending the first ignition cycle of the vehicle, saving to memory the first frame of captured image data;
capturing a second frame of image data by the camera when the vehicle is stationary during a second ignition cycle of the vehicle following the first ignition cycle;
wherein the second ignition cycle is the next ignition cycle of the vehicle following the first ignition cycle;
comparing, via the image processor, the first frame of captured image data to the second frame of captured image data;
determining, via comparison by the image processor of the first frame of captured image data to the second frame of captured image data, a change in orientation of the camera from a first orientation during the first ignition cycle of the vehicle to a second orientation during the second ignition cycle of the vehicle;
wherein determining a change in orientation of the camera comprises determining a change in orientation of the camera relative to ground that is indicative of loading or unloading of the vehicle between the first and second ignition cycles; and
responsive to determination of the change in orientation of the camera, adjusting processing by the image processor of frames of image data captured by the camera during the second ignition cycle to accommodate the determined change in orientation of the camera.

14. The method of claim 13, wherein capturing the first frame of image data by the camera comprises capturing the first frame of image data by the camera at or near the end of the first ignition cycle of the vehicle, and wherein capturing the second frame of image data by the camera comprises capturing the second frame of image data at the onset of the second ignition cycle of the vehicle.

15. The method of claim 13, comprising providing a video display in the vehicle that is viewable by a driver of the vehicle, wherein the video display displays video images derived from frames of image data captured by the camera, and wherein adjusting processing by the image processor of frames of image data captured by the camera during the second ignition cycle comprises adjusting processing by the image processor of frames of image data captured by the camera during the second ignition cycle to adjust display of video images at the video display.

16. The method of claim 13, wherein providing a camera comprises providing a rear camera at a rear portion of the vehicle that has a field of view rearward of the vehicle.

17. The method of claim 13, wherein providing a camera comprises providing a plurality of cameras at the vehicle that have respective fields of view exterior of the vehicle.

18. A method for calibrating a camera of a vehicular vision system, said method comprising:
providing a camera at a vehicle so as to have a field of view exterior of the vehicle;
providing an image processor at the vehicle for processing frames of image data captured by the camera;
capturing a first frame of image data by the camera when the vehicle is stationary at or near the end of a first ignition cycle of the vehicle;
responsive to ending the first ignition cycle of the vehicle, saving to memory the first frame of captured image data;
capturing a second frame of image data by the camera when the vehicle is stationary at the onset of a second ignition cycle of the vehicle following the first ignition cycle;
wherein the second ignition cycle is the next ignition cycle of the vehicle following the first ignition cycle;

comparing, via the image processor, the first frame of captured image data to the second frame of captured image data;

determining, via comparison by the image processor of the first frame of captured image data to the second frame of captured image data, a change in orientation of the camera from a first orientation during the first ignition cycle of the vehicle to a second orientation during the second ignition cycle of the vehicle; and responsive to determination of the change in orientation of the camera, adjusting processing by the image processor of frames of image data captured by the camera during the second ignition cycle to accommodate the determined change in orientation of the camera.

19. The method of claim 18, comprising providing a video display in the vehicle that is viewable by a driver of the vehicle, wherein the video display displays video images derived from frames of image data captured by the camera, and wherein adjusting processing by the image processor of frames of image data captured by the camera during the second ignition cycle comprises adjusting processing by the image processor of frames of image data captured by the camera during the second ignition cycle to adjust display of video images at the video display.

20. The method of claim 18, wherein providing a camera comprises providing a rear camera at a rear portion of the vehicle that has a field of view rearward of the vehicle.

21. The method of claim 18, wherein providing a camera comprises providing a plurality of cameras at the vehicle that have respective fields of view exterior of the vehicle.

22. The method of claim 18, wherein comparing the first frame of captured image data to the second frame of captured image data comprises comparing features of the second frame of captured image data to features of the first frame of captured image data.

* * * * *